United States Patent [19]

Ikeda

[11] 4,437,103

[45] Mar. 13, 1984

[54] INK-JET NOZZLE AND A METHOD FOR MANUFACTURING SAME

[75] Inventor: Kunio Ikeda, Kawasaki, Japan

[73] Assignee: Ricoh Company, Ltd., Japan

[21] Appl. No.: 340,229

[22] Filed: Jan. 18, 1982

[30] Foreign Application Priority Data

Jan. 16, 1981 [JP] Japan .................................. 56-3728

[51] Int. Cl.$^3$ ...................... G01D 15/18; B21D 53/00

[52] U.S. Cl. ............................ 346/140 R; 29/157 C; 239/601

[58] Field of Search ......................... 346/1.1, 75, 140; 29/157 C; 239/596, 597, 601, DIG. 19

[56] References Cited

U.S. PATENT DOCUMENTS

| | | | |
|---|---|---|---|
| 3,662,399 | 5/1972 | Yanou et al. | 346/140 IJ |
| 3,823,408 | 7/1974 | Gordon | 346/140 IJ |
| 3,958,249 | 5/1976 | De Maine et al. | 346/1.1 |

OTHER PUBLICATIONS

I.B.M. Technical Disclosure Bulletin, vol. 15, No. 3, Aug. 1972, p. 910.

*Primary Examiner*—Donald A. Griffin
*Attorney, Agent, or Firm*—Guy W. Shoup; Leighton K. Chong

[57] ABSTRACT

An ink-jet nozzle for use in an ink-jet printer with stable ink discharging characteristics and excellent machining capability and a method for manufacturing same are provided. The present ink-jet nozzle is generally in the shape of a disc provided with a through-hole in the center which serves as an ink passage. The disc has a double annular structure in which the inner annular portion has the Vickers hardness value in the range between 500 and 600, whereas the outer annular portion has a value approximately a half thereof.

8 Claims, 4 Drawing Figures

INK-JET NOZZLE AND A METHOD FOR MANUFACTURING SAME

BACKGROUND OF THE INVENTION

1. Field of the Invention

This invention generally relates to an ink-jet printer and more in particular to an ink-jet nozzle for use in an ink-jet printer and a method for manufacturing such a nozzle.

2. Description of the Prior Art

An ink-jet printer is well known in the art. It is a non-impact type printer which includes an ink-jet nozzle from which ink droplets are discharged under electrostatic acceleration to be impinged upon a recording medium after suitable deflection in a dot-matrix format to form characters on the recording medium. In an ink-jet printer, a nozzle for discharging ink droplets plays an important role in the ink-jet printing characteristics. For example, it must be hard enough to prevent formation of cracks or scratches on the nozzle passage through which ink is discharged. At the same time, it should not be too hard to present difficulty in its manufacturing process.

According to one well-known method for manufacturing an ink-jet nozzle, nickel is electrodeposited onto a wire, the diameter of which corresponds to the diameter of a desired nozzle, to form a nickel rod enclosing the wire at its center. Then the thus formed nickel rod is sliced into a disc of approximately 0.5 mm thick. Upon polishing both sides of the sliced disc, the wire at the center is removed with the use of an appropriate chemical agent thereby forming a desired nozzle for use in an ink-jet printer.

As a modification of the above-described method, it is also known to manufacture a nozzle having Hv (Vickers hardness) of 300–350 at the inner periphery which gradually changes to 200–250 at the outer periphery, as shown in FIG. 1, by changing electrodeposition conditions, particularly the cathode current density, with the use of total nickel chloride solution. Moreover, it is also known that nickel sulfamate solution may be substituted for total nickel chloride. It is also known to manufacture the nozzle having Hv of 400–600 at its inner and outer peripheries by adding nickel chloride or a stress reducing agent such as a brightener, saccharin, etc. to nickel sulfamate solution.

In accordance with the above-described prior art with the use of total nickel chloride solution or nickel sulfamate solution, a difference in hardness between the inner and outer portions of the nozzle member is produced by controlling the cathode current density inside the electrolytic solution of the same composition. Therefore the initial rate of electrodeposition is extremely slow since electrodeposition is carried out with a low current density. Moreover, to increase the hardness just by controlling the current density is rather limited.

It is also to be noted that the hardness Hv in the range between 300 and 350 is not enough and chips are formed during the process of manufacturing the nozzle, which chips remain as flashes after removal of the wire. Therefore, a step for removing flashes is required. Moreover, during maintenance operation, such as washing and cleaning, of the nozzle head, scratches tend to be formed at the edge portion of the nozzle mouth from which ink is discharged, thereby adversely affecting the ink discharging characteristics. Thus, this prior art nozzle is disadvantageous because its scratch-resistance property is unsatisfactory.

It is true that the prior art also provides an ink-jet printer nozzle having the Hv hardness in the range between 400 and 600. However, this prior art nozzle has such high values of Hv throughout its body including the outer peripheral portion which has nothing to do with the ink discharging characteristics. Thus, it is also disadvantageous because machining such as cutting (slicing) and shaping requires a long period of time and wear of machine tools is extremely severe.

SUMMARY OF THE INVENTION

The disadvantages of the prior art are overcome with the present invention, and an ink-jet nozzle for use in an ink-jet printer having a novel structure and a method for manufacturing same are provided.

In accordance with one feature of the present invention, there is provided an ink-jet printer nozzle generally in the shape of a disc provided with a through-hole at its center as an ink passage, said nozzle comprising an inner annular portion having a first hardness and an outer annular portion integral with said first annular portion and having a second hardness, said first hardness being substantially larger than said second hardness. Preferably, the first hardness is selected to be in the range between 500 and 600 in terms of Vickers hardness values and the second hardness to be approximately a half of the first hardness.

In accordance with another aspect of the present invention, there is provided a method for manufacturing a nozzle for use in an ink-jet printer, said method comprising the steps of:

(a) electrodepositing a first material onto a wire of predetermined diameter in a first electrolytic solution to form an inner sheath of said first material having a first outer diameter on said wire;

(b) electrodepositing a second material onto the outer surface of said inner sheath in a second electrolytic solution to form an outer sheath of said second material having a second outer diameter on said inner sheath thereby forming an electrodeposited rod;

(c) cutting said rod in the direction perpendicular to the longitudinal axis of said rod to form a disc having portions of said wire and said first and second sheaths; and (d) removing the wire portion from said disc to form a through-hole as an ink passage thereby providing said disc as the ink-jet nozzle.

Preferably, the first and second materials are the same material which, in turn, is preferably nickel.

Therefore it is an object of the present invention to provide an ink-jet nozzle which can satisfy the requirements of high scratch-resistant and facile machining characteristics at the same time.

Another object of the present invention is to provide an ink-jet nozzle having a double-annular layer structure including the inner annular layer which is substantially harder than the outer annular layer.

A further object of the present invention is to provide an ink-jet nozzle which is simple in structure and therefore easy to manufacture.

A still further object of the present invention is to provide a method for manufacturing an ink-jet nozzle having a double-annular layer structure.

A still further object of the present invention is to provide a method for manufacturing an ink-jet nozzle which is highly controllable and easy to carry out.

Other objects, advantages and novel features of the present invention will become apparent from the following detailed description of the invention when considered in conjunction with the accompanying drawings.

DESCRIPTION OF THE PREFERRED EMBODIMENTS

Figure 1:
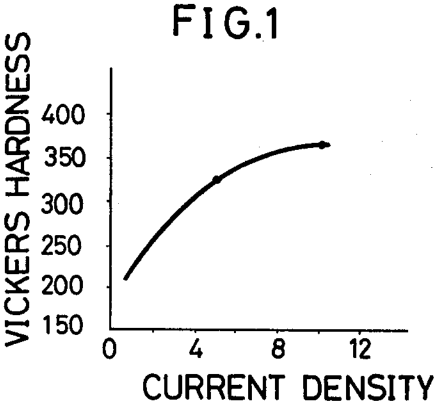
FIG. 1 is a graph showing the relationship between the current density in A/dm$^2$ (abscissa) at the time of electrodeposition and the resulting Vickers hardness.
Figure 2:
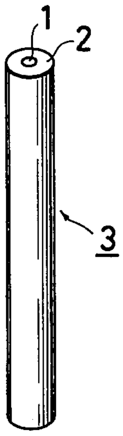
FIG. 2 is a perspective view showing the situation after the completion of the first electrodeposition step in accordance with one embodiment of the present invention.
Figure 3:
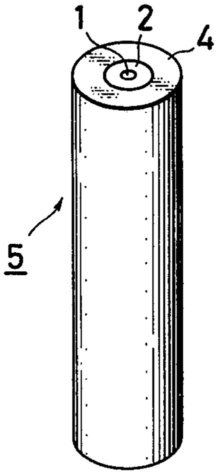
FIG. 3 is a perspective view showing the situation after the completion of the second electrodeposition step in accordance with one embodiment of the present invention.

Referring to FIGS. 2 and 3, it will now be described as to the method for manufacturing an ink-jet nozzle in accordance with one embodiment of the present invention. First, a hand copper wire 1 of 30 μm in diameter is prepared. The wire 1 is immersed as an electrode in a first electrolytic solution which comprises nickel sulfamate solution with nickel chloride and a stress reducing agent added. Then electrodeposition is continued until a nickel sheath 2 of 0.5 mm in diameter is formed around the wire 1, as shown in FIG. 2, thereby forming an intermediate electrodeposited rod 3.

The composition of the first electrolytic solution is as follows:

| | |
|---|---|
| Nickel Sulfamate | 270-330 grm/l |
| Nickel Chloride | 30 grm/l |
| Boric Acid | 30-45 grm/l |
| Stress Reducing Agent | 8 grm/l |
| PH | 3.5-4.2 |
| Pit Preventing Agent | 0.5 grm/l. |

On the other hand, the operating conditions under which electrodeposition is carried out to form intermediate electrodeposited rod 3 are as follows:

| | |
|---|---|
| Temperature | 50° C. |
| Current Density | 10 A/dm$^2$. |

Then, the rod 3 is immersed as an electrode in a second electrolytic solution and a second electrodeposition is carried out until an outer nickel sheath 4 of 3 mm in diameter is formed around the inner nickel sheath 2 of the intermediate rod 3, as shown in FIG. 3, thereby forming an electrodeposited rod 5.

The composition of the second electrolytic solution is as follows:

| | |
|---|---|
| Nickel Sulfamate | 455 grm/l |
| Boric Acid | 30 grm/l |

-continued

| | |
|---|---|
| Pit Preventing Agent (lauryl sodium sulfate) | 0.5 grm/l |

Moreover, the operating conditions under which electrodeposition is carried out to form electrodeposited rod 5 are as follows:

| | |
|---|---|
| Temperature | 50-60° C. |
| Current density | 10-15 A/dm$^2$. |

Figure 4:
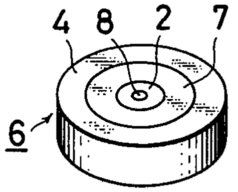
FIG. 4 is a perspective view showing the ink-jet nozzle in accordance with one embodiment of the present invention.

Then the thus formed rod 5 is sliced in the direction perpendicular to the longitudinal direction of the rod 5 to form a disc 6 containing a portion of the wire 1 at its center, a portion of the inner sheath 2 around the wire portion and a portion of the outer sheath 4 around the inner sheath. The disc 6 is preferably of 0.5 mm thick. Then one end surface, top surface in the case of the embodiment shown in FIG. 4, is ground to form a cup-shaped dent 7, preferably of 1 mm in radius. Then, after polishing, the hard copper wire 1 is removed from the disc 6 by any conventional method such as chemical etching thereby forming a through-hole 8 of 30 μm in diameter in the disc 6. The through-hole 8 provides an ink passage.

The disc 6 thus manufactured, as shown in FIG. 4, provides the ink-jet nozzle of the present invention. As shown, the ink-jet nozzle 6 comprises the inner annular portion 2 which has been formed by the first electrodeposition step and the outer annular portion 2 which has been formed by the second electrodeposition step. As is obvious for those skilled in the art, the inner annular portion 2 is substantially hard in the range between 500 and 600 in terms of Vickers hardness and it defines the shape of the ink passage. Thus, the present ink-jet nozzle is excellent in wear-resistant against ink and scratch-resistant at its mouth. Accordingly, the present ink-jet nozzle can provide constant ink discharging characteristics over a long period of time.

Furthermore, the present ink-jet nozzle 6 has the outer annular portion 4 which is not as hard as the inner annular portion 2. Preferably, the hardness of the outer portion 4 is approximately a half of that of the inner portion 2. Since the outer portion 4 has nothing to do with the ink discharging characteristics of the nozzle and this portion is usually used in mounting the nozzle 6 on a printer head, to make the outer portion 4 with a low hardness is particularly useful. Such a structure is also advantageous in forming the dent 7.

As described above, since the present invention provides an ink-jet nozzle having a double-annular layer structure, it allows to select the hardness of each layer from a wide range and even if the two layers are selected to have widely different hardness values as compared with the prior art, it does not present any practical problem.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink-jet nozzle for use in an ink-jet printer, said nozzle being generally in the shape of a disc provided with a through-hole at its center as an ink passage, said nozzle comprising an inner annular portion having a first hardness and an outer annular portion contiguous to and integral with said inner annular portion and having a second hardness, said first hardness being substantially larger than said second hardness, said inner and outer annular portions being comprised of an electrodeposited material.

2. The ink-jet nozzle as in claim 1 wherein said first hardness is selected to be in the range between 500 and 600 in terms of Vickers hardness values and said second hardness to be approximately a half of said first hardness.

3. The ink-jet nozzle as in claim 1 or 2 wherein said electrodeposited material is nickel.

4. The ink-jet nozzle as in claim 1, 2 or 3 wherein said inner annular portion has an inner diameter of 30 μm, defining the ink passage, and an outer diameter of 0.5 mm and said outer annular portion has an outer diameter of 3 mm.

5. The ink-jet nozzle as in claim 4 wherein said disc is 0.5 mm thick.

6. A method for manufacturing an ink-jet nozzle for use in an ink-jet printer, said method comprising the steps of:

(a) electrodepositing a first material onto a wire of predetermined diameter in a first electrolytic solution to form an inner sheath of said first material having a first outer diameter on said wire;

(b) electrodepositing a second material onto the outer surface of said inner sheath in a second electrolytic solution to form an outer sheath of said second material having a second outer diameter on said inner sheath thereby forming an electrodeposited rod;

(c) cutting said rod in the direction perpendicular to the longitudinal axis of said rod to form a disc having portions of said wire and said first and second sheaths; and (d) removing the wire portion from said disc to form a through-hole as an ink passage thereby providing said disc as the ink-jet nozzle.

7. The method as in claim 6 wherein said first and second materials are both nickel.

8. The method as in claim 6 or 7 wherein said first electrolytic solution comprises 270–330 grm/l of nickel sulfamate, 30 grm/l of nickel chloride, 30–45 grm/l of boric acid, 8 grm/l of stress reducing agent and 0.5 grm/l of pit preventing agent and the operating conditions of said step (a) include the temperature of 50° C. and the current density of 10 A/dm$^2$ and wherein said second electrolytic solution comprises 455 grm/l of nickel sulfamate, 30 grm/l of boric acid and 0.5 grm/l of pit preventing agent and the operating conditions of said step (b) include the temperature of 50°–60° C. and the current density of 10–15 A/dm$^2$.

* * * * *